Figure 1:
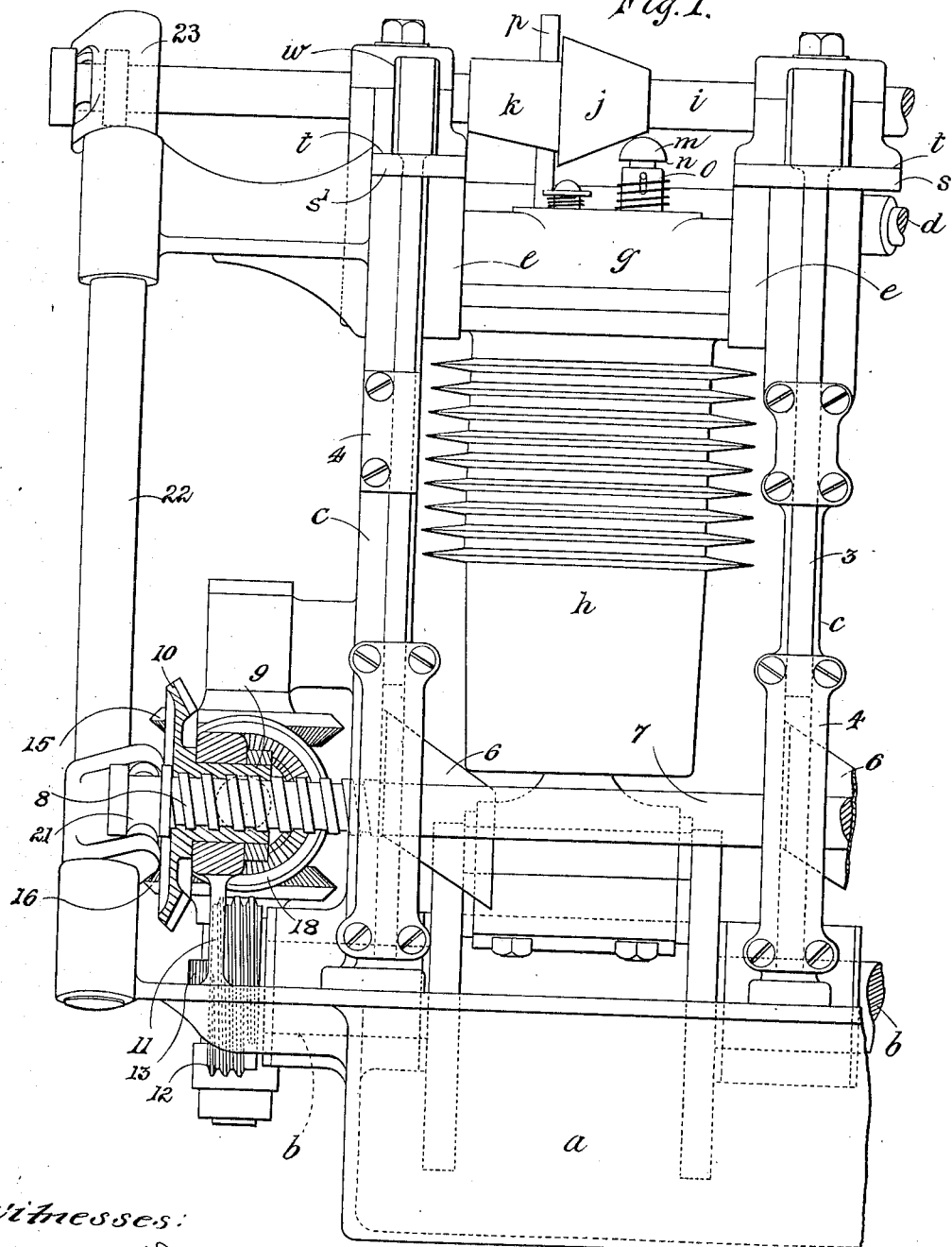

No. 870,966. PATENTED NOV. 12, 1907.
T. S. JAMES & T. H. WILSON.
INTERNAL COMBUSTION ENGINE.
APPLICATION FILED JAN. 15, 1907.

4 SHEETS—SHEET 2.

Witnesses:

Inventors
Thomas S. James
Thomas H. Wilson
By James L. Norris
Atty.

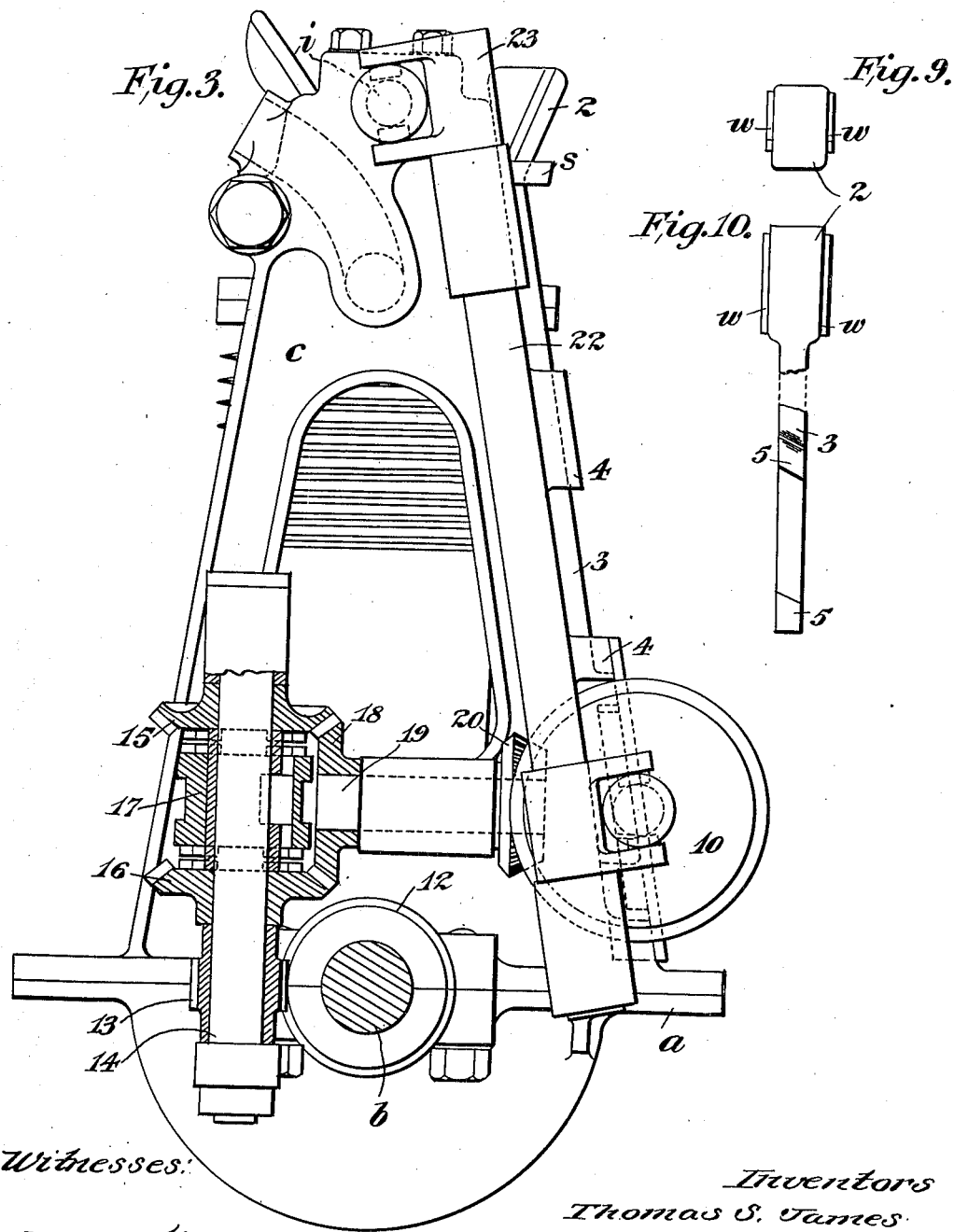

No. 870,966. PATENTED NOV. 12, 1907.
T. S. JAMES & T. H. WILSON.
INTERNAL COMBUSTION ENGINE.
APPLICATION FILED JAN. 15, 1907.

4 SHEETS—SHEET 4.

UNITED STATES PATENT OFFICE.

THOMAS SPENCER JAMES, OF CHISWICK, AND THOMAS HERBERT WILSON, OF LONDON, ENGLAND.

INTERNAL-COMBUSTION ENGINE.

No. 870,966.      Specification of Letters Patent.      Patented Nov. 12, 1907.

Application filed January 15, 1907. Serial No. 352,439.

*To all whom it may concern:*

Be it known that we, THOMAS SPENCER JAMES, a subject of the King of Great Britain, residing at Chiswick, Middlesex, England, and THOMAS HERBERT WILSON, a subject of the King of Great Britain, residing at London, England, have invented certain new and useful Improvements in Internal-Combustion Engines, of which the following is a specification.

This invention relates to internal combustion engines and has for its object to provide for adjusting the cylinder relatively to the crank, that is to say, for moving the cylinder when required towards or away from the crank for the purpose of varying the size of the compression space or combustion chamber. The variations of the size of the combustion chamber may be made in agreement with the variations of the extent of opening of the throttle valve, thereby enabling a substantially constant compression to be maintained irrespective of the amount of the charge. The size of the combustion chamber may however be varied if required without reference to the position of the throttle valve.

Our improvements are applicable to the engine described in the specification accompanying application for Letters Patent Serial No. 333732 dated 7th September 1906 in which engine the cylinder is moved towards the crank during the exhaust stroke for the purpose of expelling all the spent products of combustion, and then is moved away from the crank during the suction stroke, and allowed to remain against its abutments during the compression and firing strokes. Our said improvements are also applicable to other types of engine in which the cylinder does not move as above described for obtaining complete expulsion of the products of combustion.

According to our present invention, the cylinder may for the purpose of permitting variation of the size of the combustion chamber be constructed with a capability of moving in fixed or adjustable guides, or it may be carried by arms which can be oscillated for this purpose, and in the latter case the engine may have a bottle-shaped piston connected directly to the crank, or it may have an ordinary piston and connecting rod. When a bottle-shaped piston is used, the cylinder oscillates about trunnions mounted in bearings formed in the oscillating arms, and these trunnions are preferably utilized as in the specification above mentioned for introducing the charge to the cylinder and for carrying off the exhaust products of combustion.

The adjustment of the cylinder relatively to the crank may be effected by manual power in the case of small engines and while the engine is not running in the case of multiple cylinder engines or engines of high power, but we prefer to utilize the power of the engine for effecting the adjustment.

In the accompanying drawings we have illustrated our invention as applied to an engine of the type described in the hereinbefore mentioned specification, and have shown means whereby the power of the engine can be used to adjust the position of the cylinder.

Figure 2:
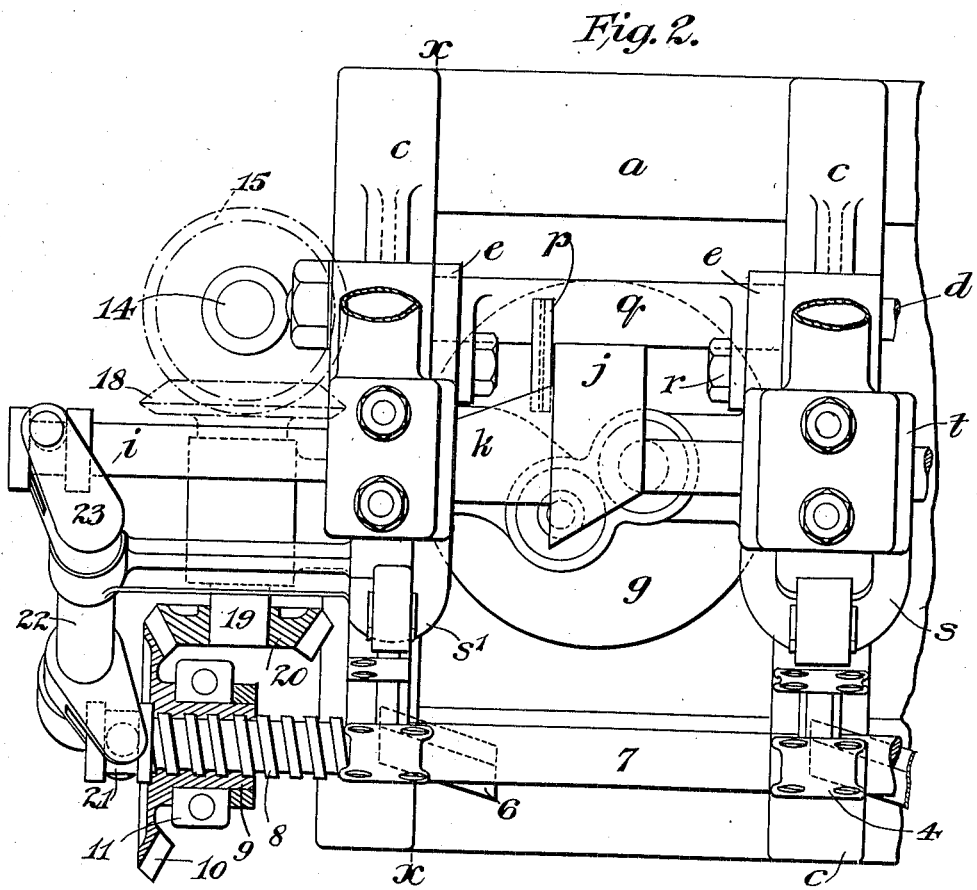
Figure 5:
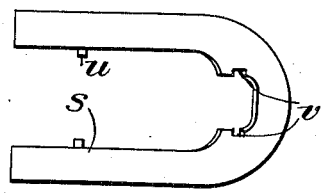
Figure 7:
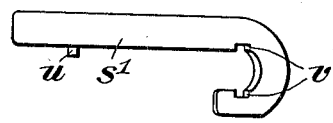
Figure 6:
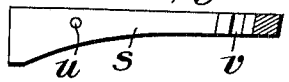
Figure 8:
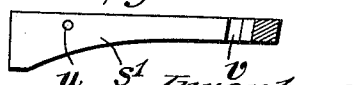
Figure 4:
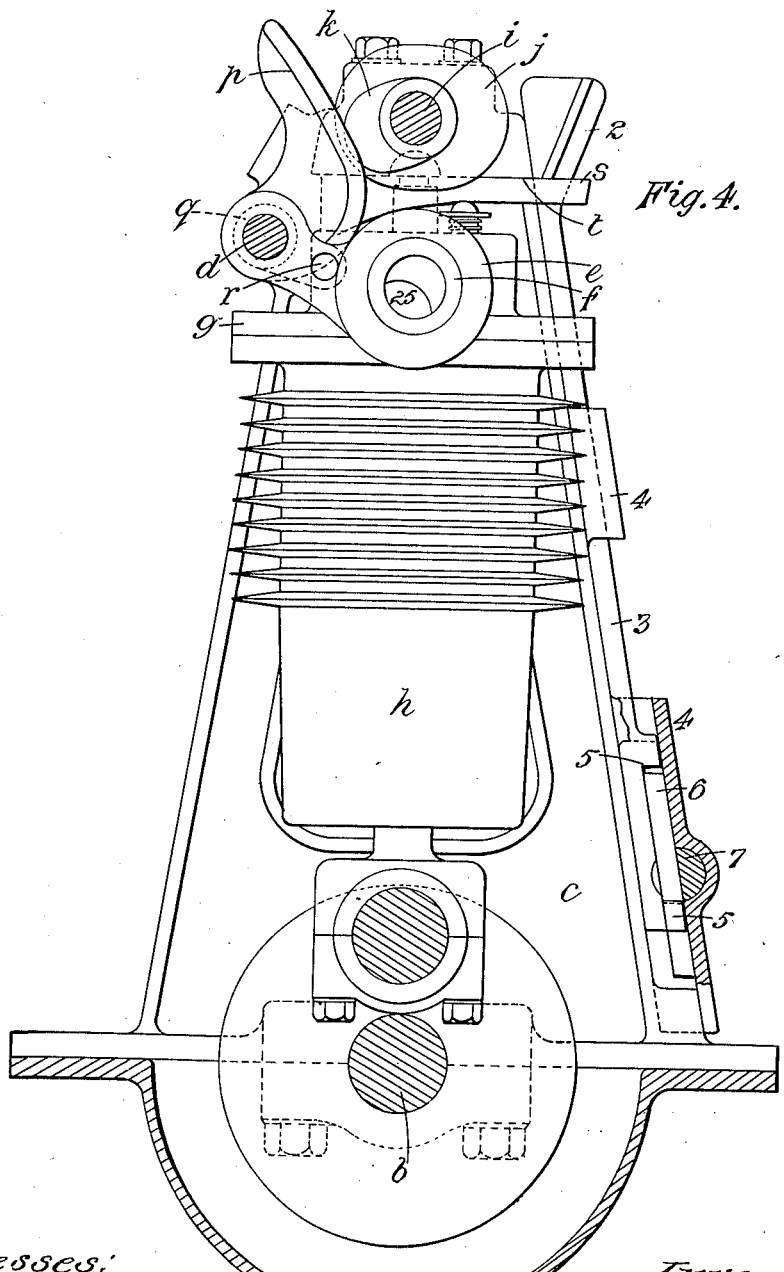

Figure 1 is a side view of a portion of the engine, the same having a multiple number of cylinders, parts being shown in section. Fig. 2 is a plan, and Fig. 3 is an end view of the same with parts shown in section. Fig. 4 shows a vertical section of the engine on the line $x,x$ Fig. 2. Figs. 5 and 6 show a wedge piece in plan and central section respectively, and Figs. 7 and 8 are similar views of another form of wedge piece. Figs. 9 and 10 are a plan and side view respectively of a cam for moving the cylinder.

Like letters of reference denote corresponding parts in the several figures.

Referring to the accompanying drawings, $a$ is a bed plate supporting bearings for a crank shaft $b$ and having frames or standards $c$ mounted thereon. The said frames or standards also support a shaft $d$ on which arms $e$ are mounted. These arms are provided with bearings to receive trunnions $f$ formed on or attached to the cylinder cover $g$, the whole thus forming an oscillatory support for the cylinder $h$. The frame may be extended to support any number of such cylinders each supported and operated in the manner hereinafter set forth with reference to one cylinder only.

In suitable bearings above the cylinder is arranged a rotatable shaft $i$ preferably driven from the crank shaft of the engine through gearing (not shown) having a velocity ratio such that the shaft $i$ is rotated through one revolution for each two revolutions of the crank shaft. On the shaft $i$ are mounted two cams $j$, $k$ respectively. The cam $j$ as here shown, by its rotation operates the exhaust valve through the spindle $m$ thereof which is formed with a shoulder $n$ to engage a projection $o$ on the cylinder head through which the said spindle passes. The cam $j$ is so designed that, after the exhaust valve has been opened, continued rotation of the cam moves the cylinder $h$ downwardly or forwardly, the arms $e$ turning on the shaft $d$, and the trunnions turning in the said arms. The cam $k$ is arranged to engage an arm $p$ on the sleeve $q$ rotatably mounted on the shaft $d$. This sleeve is secured to the arms $e$ by bolts $r$ so that when the cam $k$ presses the arm $p$ away from the shaft $i$ the arms $e$ are moved to raise the cylinder $h$.

To form a solid abutment for the cylinder during the compression and firing strokes, wedge pieces $s$, $s'$ are provided the position of which can be adjusted as hereinafter described. These wedge pieces are supported in any convenient manner beneath shoulders $t$ on the frames or standards $c$ by screws or lugs $u$ projecting from the inner sides thereof and traveling in slots formed for this purpose in the sides of the said frames or standards. The wedge pieces s, s′ are formed with inclined grooves v which are engaged by inclined ribs w on positioning cams 2 formed on the ends of rods 3 sliding in guide-ways 4. The rods 3 are formed with lugs 5, 5 between which cams 6 are adapted to slide. These cams 6 are formed on or attached to a non-rotary shaft 7 having a screw-thread 8 at one end engaging in a nut 9 rotated by the gear or bevel wheel 10. The nut is supported against axial movement in a bracket 11 extending from the bed or frame of the engine.

The crank shaft b has keyed thereto a worm 12 gearing with a worm wheel 13 on a clutch shaft 14 having bevel wheels 15, 16, formed with clutch parts, loosely mounted thereon. A clutch member 17 rotated by the shaft 14 can be put into engagement with either bevel wheel 15, 16 by a clutch lever (not shown) to cause the rotation in either direction, as required, of the bevel wheel 18 on the shaft 19 carrying a bevel wheel 20 gearing with the bevel wheel 10.

The shaft 7 is provided with a journaled portion at 21 engaged by a fork on a shaft 22 which also carries a second fork 23 engaging the journaled end of the cam shaft i.

From the construction hereinabove described it is obvious that when the positions of the wedge pieces s, s′ are varied by the axial movement of the shaft 7 acting through the cams 6 and positioning cams 2 the cam shaft i is simultaneously moved axially so that the operative parts of the cams j, k are also varied. The cam k is formed to give a variable throw to the arm p as the said cam is moved axially so that whatever the positions of the wedge pieces s, s′ the cylinder is always brought into contact therewith at the end of the suction stroke so that the cylinder is supported by a rigid abutment during the explosion of the charge and while the piston makes its firing stroke. As the said wedge pieces are firmly clamped between the cylinder and the shoulders on the frames or standards during the compression and firing strokes it would be difficult at such times to effect a movement of the said wedges manually, and in multiple cylinder engines where one or other of the cylinders is at any given instant exploding its charge or making its operative stroke, it would be difficult at all times to effect an adjustment of the wedges by manual power. It is chiefly for this reason that we prefer to move the wedges by the power of the engine.

Two different shapes of wedge pieces are shown in Figs. 5 and 6 and in Figs. 7 and 8 respectively. The wedge shown in Figs. 5 and 6 has two arms each of which forms the abutment for a separate cylinder and embraces a frame or standard c as shown in relation to the righthand frame or standard in Figs. 1 and 2. The wedge piece shown in Figs. 7 and 8 has only a single arm and is used in conjunction with an end frame or standard, such as the left hand frame or standard in Figs. 1 and 2. The positions of these wedge pieces determines the distance the cylinder can be moved away from the crank shaft and since the path of the piston is fixed variation of the distance by which the cylinder is moved away from the crank shaft causes a corresponding variation of the compression space or combustion chamber.

Instead of employing a cam such as the cam k to move the cylinder away from the crank shaft we may employ a spring or springs the motion of the cylinder being similarly limited in this case by wedge pieces such as s, s′.

The cam j is formed with one part thereof adapted to give a constant throw whatever the longitudinal movement made by the shaft i. The cylinder is thereby moved at each revolution of the said cam, a constant distance towards the crank shaft as described in the hereinbefore mentioned prior specification. Another part of this cam gives a variable throw so that the exhaust valve is duly operated at the appropriate time by the said cam whatever may be the position in which the cylinder is arrested by the wedge pieces s, s′ the cam j being moved with the cam shaft i an amount corresponding to the alteration of the positions of the wedge pieces.

It is not essential that the cam j should act on the cylinder through the exhaust valve spindle as shown but this is a convenient arrangement since the one cam then serves a dual purpose and the provision of a separate cam for operating the exhaust valve is not then necessary.

In the engine shown the trunnions f are made hollow and form conduits between the interior of the cylinder and the charge-supply and exhaust ports, e. g., 25, Fig. 4, formed in the frames or standards c as described in the beforementioned prior specification.

What we claim is:—

1. In an internal combustion engine, the combination of a cylinder support, a crank shaft, a cylinder movable towards and away from the crank shaft, adjustable abutments to take the thrust due to the explosion, means for adjusting the abutments and thereby the cylinder in order to vary the size of the combustion chamber.

2. In an internal combustion engine, the combination of a cylinder support, a crank shaft, a cylinder movable towards and away from the crank shaft, adjustable abutments, and gearing actuated by the crank shaft of the engine for adjusting the abutments and thereby the cylinder for the purpose of varying the size of the combustion chamber.

3. In an internal combustion engine, the combination of a cylinder support, a crank shaft, a cylinder movable towards and away from the crank shaft, means for moving the cylinder towards the crank during the exhaust stroke to expel the spent gases, means to bring the cylinder back against its abutments, adjustable abutments to take the thrust due to the explosion, means for adjusting the abutments and thereby the cylinder in order to vary the size of the combustion chamber.

4. In an internal combustion engine, the combination of a cylinder support, a crank shaft, a cylinder movable towards and away from the crank shaft, means for moving the cylinder towards the crank during the exhaust stroke to expel the spent gases, means to bring the cylinder back against its abutments, said means for moving the cylinder towards the crank comprising a cam operating on the cylinder through the spindle of the exhaust valve, and so shaped that one part thereof has a constant throw to effect the movement of the cylinder, and another part has a variable throw for operating the exhaust valve, said exhaust valve and its spindle, adjustable abutments to take the thrust due to the explosion, and means for adjusting the abutments and thereby the cylinder to vary the size of the combustion chamber.

5. In an internal combustion engine, the combination of a cylinder support, a crank shaft, a cylinder, a cam for moving the cylinder towards the crank during the exhaust stroke, adjustable abutments for taking the thrust due to the explosion, a cam for returning the cylinder to said abutments and means for adjusting the abutments and thereby the cylinder in order to vary the size of the combustion chamber.

6. In an internal combustion engine, the combination of a cylinder support, a crank shaft, a cylinder, a cam for moving the cylinder towards the crank during the exhaust stroke, adjustable abutments for taking the thrust due to the explosion, a cam for returning the cylinder to said abutments, said cams being axially adjustable, means for adjusting them, and means for adjusting the abutments and thereby the cylinder in order to vary the size of the combustion chamber.

7. In an internal combustion engine, the combination of a cylinder support, a crank shaft, a cylinder, a cam for moving the cylinder towards the crank during the exhaust stroke, adjustable abutments for taking the thrust due to the explosion, a cam for returning the cylinder to said abutments, said cams being axially adjustable, means for adjusting the cams, means for adjusting the abutments, and gearing operated by the crank shaft, to simultaneously operate the means for adjusting the cams and the abutments.

8. In an internal combustion engine, the combination of a cylinder support, a crank shaft, a cylinder, a cam for moving the cylinder towards the crank during the exhaust stroke, adjustable abutments for taking the thrust due to the explosion, a cam for returning the cylinder to said abutments, said cams being axially adjustable, means for adjusting them, means for adjusting the abutments, said means consisting of gearing operated by the crank shaft, through a clutch, a spindle movable axially by the gearing, and sliding cams and bars operatively connecting the spindle to the abutments.

In testimony whereof we have hereunto set our hands in presence of two subscribing witnesses.

THOMAS SPENCER JAMES.
THOMAS HERBERT WILSON.

Witnesses:
HERBERT ARTHUR BEESTON,
H. D. JAMESON.